Patented July 5, 1938

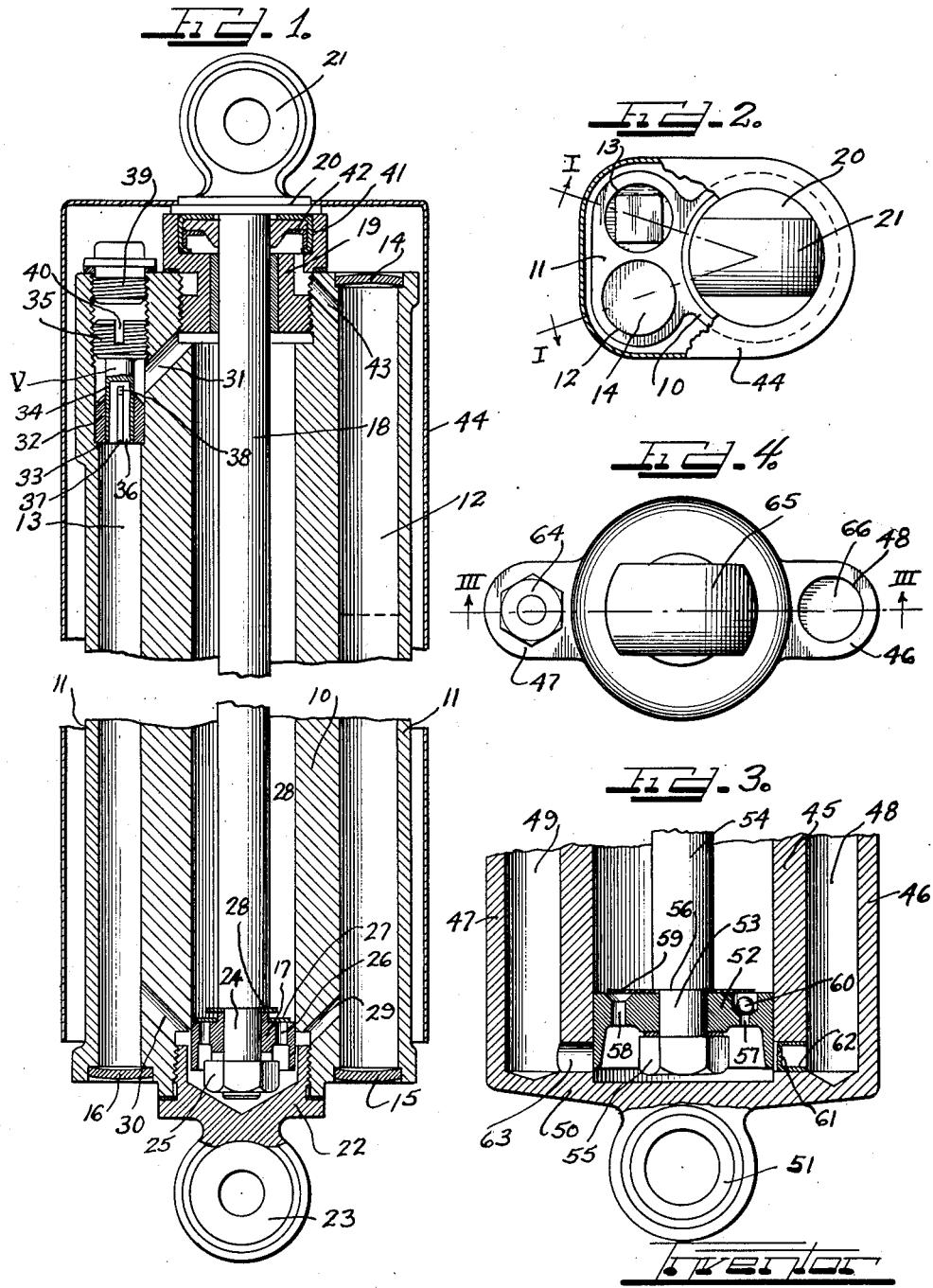

2,122,406

UNITED STATES PATENT OFFICE 2,122,406

HYDRAULIC SHOCK ABSORBER

Anthony B. Casper, Buffalo, N. Y., assignor to Houde Engineering Corporation, Buffalo, N. Y., a corporation of New York Application March 15, 1937, Serial No. 130,849

2 Claims. (Cl. 188—88)

My invention relates to hydraulic shock absorbers, particularly to those of the direct acting type in which a cylinder structure and a piston structure have relative longitudinal movement for displacement of hydraulic fluid under valve control during service of the shock absorber in connection with vehicle springs.

An important object of the invention is to produce a shock absorber of this type in which the cylinder structure is in the form of a casting providing the cylinder bore and having longitudinally extending bosses on its outer side which are bored so that one of them may serve as a reservoir for hydraulic fluid and the other may serve as a passageway or channel for the flow of displaced hydraulic fluid from one side of the piston to the other.

A further object is to provide improved valving means in the outer end of the channel for metering the flow during rebound movement of the vehicle springs.

The invention also includes other features of construction and arrangement, and all of the features are embodied in the structures shown on the drawing, in which drawing:

Figure 1 is a vertical diametrical section of the shock absorber on plane I—I of Figure 2;

Figure 2 is an outer end view of the shock absorber with parts of the shield structure broken away;

Figure 3 is a section of the inner end of a modified shock absorber structure taken on plane III—III of Figure 4; and Figure 4 is an outer end view of the shock absorbing structure of Figure 3.

In the structure shown on Figures 1 and 2 the cylinder wall 10 has a boss 11 extending longitudinally along one side thereof, and this boss and the cylinder wall may be part of an integral casting. The boss 11 is bored to provide a fluid reservoir 12 and a fluid flow channel 13 respectively. After boring of the boss, the bore 12 forming the reservoir may be closed at its ends by discs 14 and 15, and the bore forming the channel 13 is closed at its inner end as by a disc 16.

The piston structure comprises the piston 17 and the piston rod 18 extending therefrom through the outer closure plug 19 for the cylinder, the piston rod being secured to a fitting 20 having the eye 21 for securing the piston structure to a support, such as the chassis of an automotive vehicle. The inner end of the cylinder is closed by a plug 22 having threaded engagement therein, the plug having the eye 23 whereby the cylinder structure may be secured to a support such as the axle of an automotive vehicle.

The piston 17 is received on the reduced end 24 of the piston rod and is clamped in place by a nut 25. The piston has ports 26 therethrough controlled by a valve 27 which may be in the form of an annular plate, the valve being shiftable on the piston with its outward movement limited by the stop plate 28 fastened between the piston and the piston rod.

The inner end of the cylinder space is connected with the reservoir 12 by a passageway 29. The inner end of the cylinder space is also connected with the inner end of the channel 13 by the passage 30. At its upper end the cylinder space is connected with the channel 13 by the passage 31 and between the passages 31 and 30 is interposed valve mechanism V for metering the hydraulic fluid flow during rebound movement of the vehicle spring with which the shock absorber is associated. The valve assembly is inserted in the outer end of the channel 13 so as to be readily accessible for adjustment. The valve assembly comprises the bushing 32 seated against the shoulder 33 in the channel 13, the bushing being located a short distance inwardly of the passage 31. Extending into the bushing is the cylindrical valve plug 34 which has the threaded head 35 engaging the threaded end of channel so that turning of the head will effect axial shifting of the valve in the bushing. The valve has the bore 36 which is of such diameter as to leave the valve end in the form of a thin cylindrical shell, the shell having longitudinal slits 37 cooperating with the edge of the bushing 32 to define orifice passages 38, the distance between the bushing edge and slits determining the size of the orifice passageway and thereby the resistance to the fluid flow therethrough. The edge of the bushing 32 is bevelled so as to present a sharp edge to the slits, and this sharp edge with the thin edge wall through which the slits extend will cause the orifice passages to meter the flow substantially independently of viscosity changes in the fluid.

The outer end of the channel 13 is closable by a plug 39. Upon removal of this plug the valve is accessible for adjustment, the valve head being provided with a slot 40 for the application of a screwdriver or other suitable tool whereby the valve may be readily rotated for longitudinal shift thereof to increase or decrease the size of the orifice passage.

Describing the operation, during compression movement of the vehicle spring with which the shock absorber is associated, and inward movement of the piston in the cylinder, the fluid displaced from the inner end of the cylinder will flow through the ports 26 past the valve 27 and into the outer end of the cylinder. Owing to the volumetric differential caused by the volume of the piston rod, the outer part of the cylinder cannot accommodate all of the fluid displaced from the inner end of the cylinder and the surplus fluid flows into the reservoir space 12 through the passageway 29.

During rebound movement of the vehicle springs and outward movement of the piston, the valve 27 will be closed by the fluid pressure so that the only flow from the outer end of the cylinder to the inner end thereof will be through the passage 31, the metering orifice passage 38, the channel 13, and the passage 30. Owing to the volumetric differential caused by the piston rod, outward movement of the piston will tend to create suction in the inner end of the cylinder, but this suction is broken by the flow of fluid from the reservoir 12 through the passage 29 to the inner end of the cylinder, such inflow also replenishing the cylinder with fluid to keep it filled up.

At its outer end the outer cylinder head 19 has the recess 41 for a packing assembly 42 which surrounds the piston shaft and prevents escape of leakage fluid to the exterior of the shock absorber. Any fluid leakage past the piston rod to the recess 41 will be returned to the reservoir by way of the passage 43.

The fitting 20 may support a shield structure 44 which extends therefrom and surrounds the shock absorber cylinder structure.

In the modified arrangement of Figures 3 and 4 the cylinder wall 45 has bosses 46 and 47 extending longitudinally thereon at diametrically opposite sides of the wall, the boss 46 being bored to provide the reservoir space 48 and the boss 47 being bored to form the channel 49 for the flow of the fluid displaced during vehicle spring rebound movement. The inner end of the cylinder and the inner ends of the bores 48 and 49 are closed by an end wall 50 which is integral with the cylinder and boss structure and which has the eye 51 whereby the cylinder structure may be secured to a support as the axle of an automotive vehicle. The arrangement at the outer end of the cylinder, including the metering valve for the rebound fluid flow, may be the same as that shown in Figure 1. The valving through the piston 52 is, however, somewhat modified. The piston receives the reduced inner end 53 of the piston rod 54 and is clamped thereto between the nut 55 and the shoulder 56. The piston has passages 57 and 58 therethrough, and between the shoulder 56 and the piston is clamped a flexible metal plate 59 which overlies the passageway.

The passageway or port 57 is controlled by a check valve such as the ball 60 which is held within the passageway by the plate 59. The arrangement is such that the ball will permit free flow of hydraulic fluid through the passageway 57 during in-stroke of the piston in the cylinder but will close the passageway against flow during out-stroke of the piston.

The plate 59 does not fully overlap the outer end of the passage 58 so that there may be restricted flow through the passage during inward and outward movement of the piston. Should the pressure become excessive during vehicle spring compression movement and inward movement of the piston, the plate will flex for increased flow through the passageway 58 to assist the flow through the port 57 to relieve the pressure. Owing to the volumetric differential at opposite sides of the piston due to the volume of the piston rod, the outer end of the cylinder cannot receive all of the fluid displaced from the inner end of the cylinder and the surplus fluid will flow through the passage 61 into the reservoir 48. The passage 61 may be in the form of an orifice provided in the base of a thimble 62.

During rebound movement of the vehicle spring and outward movement of the piston in the cylinder, the fluid displaced from the outer end of the cylinder will flow through the channel 49 under control of a valve metering orifice such as shown in Figure 1, the fluid entering the lower end of the cylinder through a passage 63. A closure plug 64 may be provided for the outer end of the channel 49 so that access may be had to the metering valve for adjustment thereof.

As shown in Figure 4, the piston rod terminates at its outer end in an eye 65 for securing of the piston structure to a support such as the chassis of an automotive vehicle. The outer end of the reservoir 48 may be closed as by means of a disc 66.

I thus provide a simple and efficient shock absorber structure of the direct acting type in which the valving assembly for metering the rebound fluid flow is at the upper end of the shock absorber when in service and is readily accessible for adjustment for setting of the orifice size for the desired shock absorber action.

Although I have shown practical and efficient embodiments of the features of my invention, I do not desire to be limited to the exact construction and arrangement shown, as changes and modifications may be made without departing from the scope of the invention.

I claim as follows:

1. In a hydraulic shock absorber of the class described, a cylinder structure, a piston structure, a check valve controlled port in said piston structure open to fluid flow during inward movement of the piston structure but closed to fluid flow during outward movement of the piston structure, another port through said piston structure, and a flap valve anchored to the piston structure and partially overlying said other part for normal closure thereof except for a restricted passage, said valve flexing for increased flow through said other port when said piston structure is moving inwardly.

2. In a hydraulic shock absorber of the direct acting type, a cylinder structure, a piston structure, a port through said piston structure, a check valve seated to close said port during outward movement of the piston structure but unseating for opening of said port during inward movement of the piston structure, another port through said piston structure, a resilient annular valve disk anchored at its inner edge to the piston structure and partially overlying said ports whereby to provide a stop for limiting the unseating movement of said check valve at one port and to provide a restricted passageway for flow of fluid through said other port during outward movement of the piston structure, said valve yielding for greater flow through said other port during inward movement of the piston structure.

ANTHONY B. CASPER.